(12) United States Patent (10) Patent No.: US 8,924,843 B1
Hao et al. (45) Date of Patent: Dec. 30, 2014

(54) VISUALIZING A PLURALITY OF TIMES SERIES IN CORRESPONDING CELL-BASED LINES OF A DISPLAY REGION

(75) Inventors: Ming C. Hao, Palo Alto, CA (US); Umeshwar Dayal, Saratoga, CA (US); Rodney L. Watson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2288 days.

(21) Appl. No.: 11/796,809

(22) Filed: Apr. 30, 2007

(51) Int. Cl.
 *G06F 3/00* (2006.01)
(52) U.S. Cl.
 USPC .......................................................... 715/220
(58) Field of Classification Search
 USPC ......... 715/211, 214, 215, 227, 228, 275, 220; 345/440–443
 See application file for complete search history.

(56) References Cited

U.S. PATENT DOCUMENTS

| | | | |
|---|---|---|---|
| 3,487,308 A | 12/1966 | Johnson | |
| 5,228,119 A * | 7/1993 | Mihalisin et al. | 345/418 |
| 5,581,678 A * | 12/1996 | Kahn | 345/440 |
| 5,581,797 A | 12/1996 | Baker | |
| 5,588,117 A | 12/1996 | Karp et al. | |
| 5,608,904 A | 3/1997 | Chaudhuri et al. | |
| 5,623,590 A | 4/1997 | Becker et al. | |
| 5,623,598 A | 4/1997 | Voigt et al. | |
| 5,634,133 A | 5/1997 | Kelley | |
| 5,659,768 A | 8/1997 | Forbes et al. | |
| 5,694,591 A | 12/1997 | Du et al. | |
| 5,742,778 A | 4/1998 | Hao et al. | |
| 5,757,356 A | 5/1998 | Takeasaki et al. | |
| 5,801,688 A | 9/1998 | Mead et al. | |
| 5,828,866 A | 10/1998 | Hao et al. | |
| 5,844,553 A | 12/1998 | Hao et al. | |
| 5,878,206 A | 3/1999 | Chen et al. | |
| 5,903,891 A | 5/1999 | Chen et al. | |
| 5,924,103 A | 7/1999 | Ahmed et al. | |
| 5,929,863 A | 7/1999 | Tabei et al. | |
| 5,930,803 A * | 7/1999 | Becker et al. | 1/1 |
| 5,940,839 A | 8/1999 | Chen et al. | |
| 5,986,673 A | 11/1999 | Martz | |
| 5,999,193 A | 12/1999 | Conley, Jr. et al. | |
| 6,052,890 A | 4/2000 | Malagrino, Jr. et al. | |
| 6,115,027 A | 9/2000 | Hao et al. | |

(Continued)

FOREIGN PATENT DOCUMENTS

EP 0778001 11/1996

OTHER PUBLICATIONS

M. C. Hao et al, U.S. Appl. No. 11/700,429, entitled "Providing an Automated Visualization of a Collection of Data Values Divided Into a Number of Bins Depending Upon a Change Feature of the Data Values," filed Jan. 31, 2007, pp. 1-19, Figs. 1A-5.

(Continued)

*Primary Examiner* — Kyle Stork

(57) ABSTRACT

A plurality of time series having corresponding sets of data over time are received. Visual indicators for display in a display region are presented for values of at least a first attribute of the plurality of time series in corresponding cell-based lines, where the cell-based lines have cells to display the corresponding visual indicators for the values of the at least first attribute over time. The plurality of time series in the display region are ordered according to an aggregate of at least one attribute of the plurality of time series.

20 Claims, 6 Drawing Sheets
(4 of 6 Drawing Sheet(s) Filed in Color)

(56) References Cited

U.S. PATENT DOCUMENTS

| | | | |
|---|---|---|---|
| 6,144,379 A | | 11/2000 | Bertram et al. |
| 6,211,880 B1 | | 4/2001 | Impink, Jr. |
| 6,211,887 B1 | | 4/2001 | Meier et al. |
| 6,222,557 B1 | * | 4/2001 | Pulley et al. ............ 345/622 |
| 6,269,325 B1 | | 7/2001 | Lee et al. |
| 6,301,579 B1 | * | 10/2001 | Becker ..................... 1/1 |
| 6,314,453 B1 | | 11/2001 | Hao et al. |
| 6,377,287 B1 | | 4/2002 | Hao et al. |
| 6,400,366 B1 | | 6/2002 | Davies et al. |
| 6,429,868 B1 | | 8/2002 | Dehner, Jr. et al. |
| 6,466,946 B1 | | 10/2002 | Mishra et al. |
| 6,502,091 B1 | | 12/2002 | Chundi et al. |
| 6,584,433 B1 | | 6/2003 | Zhang et al. |
| 6,590,577 B1 | | 7/2003 | Yonts |
| 6,603,477 B1 | | 8/2003 | Tittle |
| 6,628,312 B1 | * | 9/2003 | Rao et al. ............... 715/853 |
| 6,684,206 B2 | | 1/2004 | Chen et al. |
| 6,707,454 B1 | * | 3/2004 | Barg et al. ............. 345/440 |
| 6,711,577 B1 | * | 3/2004 | Wong et al. ............... 1/1 |
| 6,727,926 B1 | | 4/2004 | Utsuki et al. |
| 6,934,578 B2 | | 8/2005 | Ramseth |
| 6,937,238 B2 | | 8/2005 | Hao et al. |
| 7,020,869 B2 | | 3/2006 | Abari et al. |
| 7,046,247 B2 | | 5/2006 | Hao et al. |
| 7,313,533 B2 | | 12/2007 | Chang et al. |
| 7,639,256 B1 | * | 12/2009 | Yablonski et al. ............ 345/440 |
| 7,714,876 B1 | | 5/2010 | Hao |
| 7,760,203 B1 | | 7/2010 | Hao |
| 2002/0070953 A1 | * | 6/2002 | Barg et al. ............. 345/700 |
| 2002/0118193 A1 | | 8/2002 | Halstead, Jr. |
| 2002/0171646 A1 | | 11/2002 | Kandogan |
| 2003/0065546 A1 | | 4/2003 | Gorur et al. |
| 2003/0071815 A1 | | 4/2003 | Hao et al. |
| 2003/0208323 A1 | | 11/2003 | Hao et al. |
| 2003/0214504 A1 | | 11/2003 | Hao et al. |
| 2003/0218630 A1 | * | 11/2003 | Rutledge et al. ............ 345/738 |
| 2003/0221005 A1 | | 11/2003 | Betge-Brezetz et al. |
| 2004/0004617 A1 | * | 1/2004 | Street et al. ............. 345/440 |
| 2004/0051721 A1 | | 3/2004 | Ramseth |
| 2004/0054294 A1 | | 3/2004 | Ramseth |
| 2004/0054295 A1 | | 3/2004 | Ramseth |
| 2004/0095349 A1 | * | 5/2004 | Bito et al. ............. 345/440 |
| 2004/0168115 A1 | | 8/2004 | Bauernschmidt |
| 2004/0183799 A1 | | 9/2004 | Hao et al. |
| 2004/0205450 A1 | | 10/2004 | Hao et al. |
| 2004/0210540 A1 | | 10/2004 | Israel et al. |
| 2004/0252128 A1 | | 12/2004 | Hao et al. |
| 2005/0060300 A1 | * | 3/2005 | Stolte et al. .............. 707/3 |
| 2005/0066026 A1 | | 3/2005 | Chen et al. |
| 2005/0088441 A1 | | 4/2005 | Hao et al. |
| 2005/0119932 A1 | | 6/2005 | Hao et al. |
| 2005/0168467 A1 | * | 8/2005 | Ankerst ............... 345/440 |
| 2005/0177598 A1 | | 8/2005 | Hao et al. |
| 2005/0219262 A1 | | 10/2005 | Hao et al. |
| 2006/0059439 A1 | | 3/2006 | Hao et al. |
| 2006/0095858 A1 | | 5/2006 | Hao et al. |
| 2006/0164418 A1 | | 7/2006 | Hao et al. |
| 2007/0225986 A1 | | 9/2007 | Bowe, Jr. et al. |
| 2008/0180382 A1 | | 7/2008 | Hao |
| 2009/0033664 A1 | | 2/2009 | Hao et al. |

OTHER PUBLICATIONS

M.C. Chuah et al., "Dynamic Aggregation with Circular Visual Designs," School of Computer Science, Carnegie Mellon University, pp. 1-9 (1998).

M. Ankerst et al, "Towards an Effective Cooperation of the User and the Computer for Classification," Institute for Computer Science, University of Munich, pp. 1-10 (2000).

D. A. Kein et al, "Hierarchical Pixel Bar Charts," IEEE Transactfons on Visualization and Computer Graphics, vol. 8, No. 3, pp. 255-269 (Jul.-Sep. 2002).

D. A. Kein et al, "Designing Pixel-Oriented Visualization Techniques: Theory and Applications," IEEE Transactions on Visualization and Computer Grapics, vol. 6, No. 1, pp. 59-78 (Jan.-Mar. 2000).

J.V. Carlis et al, "Interactive Visualization of Serial Periodic Data," Proceedings of UIST '98, 11th Annual Symposim on User Interface Software and Technology, pp. 1-10 (Nov. 1998).

S. G. Eick et al, "Visual Scalability," Technial Report No. 106, National Instiute of Statistical Sciences, pp. 1-27 (Jun. 2000).

G.W. Furnas, "Generalized Fisheye Views," Human Factors in Computing Systems CHI '86 Conference Proceedings, pp. 16-23 (1986).

D. Kein, "Pixel Bar Charts: A New Technique for Visualizing Large Multi-Attribute Data Sets without Aggregation," pp. 1-10 (2001).

M.C. Hao et al., "Visual Mining of E-Customer Behavior Using Pixel Bar Charts," Hewlett-Packard Research Laboratories, pp. 1-7 (2001).

D.A. Kein et al, "Recursive Pattern: A Technique for Visualizing Very Large Amounts of Data," Proceedings of the 6th IEEE Visualization Conference, pp. 279-286 (1995).

A. Aris et al., "Representing Unevenly-Spaced Time Series Data for Visualization and Interactive Exploration," pp. 1-12 (2005).

M. Weber et al., "Visualizing Time-Series on Spirals," pp. 1-6 (2001).

L. Wei et al., "Assumption-Free Anomaly Detection in Time Series," University of California—Riverside, Department of Computer Science & Engineering, pp. 1-4 (2005).

R. Rao et al., "Exploring Large Tables with the Table Lens," retrieved Jan. 12, 2007, pp. 1-4.

Deun et al., Multidimensional Scaling, Open and Distance Learning, Jan. 12, 2000 (pp. 1-16).

http://www.pavis.org/essay/multidimensional_scaling.html, 2001 Wojciech Basalaj, (pp. 1-30).

B. Shneiderman, "Tree Visualization with Treemaps: a 2-D Space-Filling Approach", pp. 1-10, Jun. 1991.

U.S. Appl. No. 11/523,240 entitled "Time Relevance-Based Visualization of Data" filed Sep. 19, 2006, pp. 1-22.

\* cited by examiner

FIG. 3

VISUALIZING A PLURALITY OF TIMES SERIES IN CORRESPONDING CELL-BASED LINES OF A DISPLAY REGION

BACKGROUND

In many applications, data can be provided in a time series (data stream), in which data values are provided over a series of time points. Example applications in which data can be expressed in time series include financial applications (e.g., time series of asset prices, revenue, profit, currency exchange rates, etc.), network monitoring (e.g., metrics regarding performance of various aspects of a network, performance metrics of servers, performance metrics of routers, etc.), and so forth.

A conventional technique of visualizing multiple time series is to employ a chart (as shown in FIG. 1A) having two dimensions, where the first dimension (horizontal dimension) corresponds to time and the second dimension (vertical dimension) corresponds to a particular attribute of the time series. Each time series is represented as a curve that corresponds to the attribute values as a function of time. If many curves correspond to different time series are drawn in the same chart, then the chart can become difficult to read due to occlusion caused by multiple curves crossing over each other (see FIG. 1A). Some curves that represent time series with data values may not be visible due to relatively low values of the attribute being depicted in the chart. These curves tend to bunch up near the bottom part of the chart, rendering them undecipherable. Therefore, visualizing a large number of time series with a conventional chart technique is not effective.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are described with respect to the following figures:

FIGS. 2 and 3 illustrate several graphical user interface (GUI) screens, including a first screen to select the manner in which the time series are to be visualized, a second screen containing a color, cell-based line chart visualization of the multiple time series, and a third screen that includes detailed data associated with a particular cell in a line chart, according to an embodiment;

DETAILED DESCRIPTION

Figure 1A:
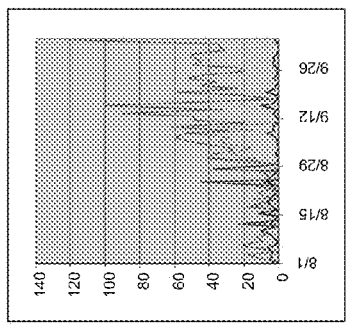
FIG. 1A illustrates a conventional chart for visualizing time series.
Figure 1B:
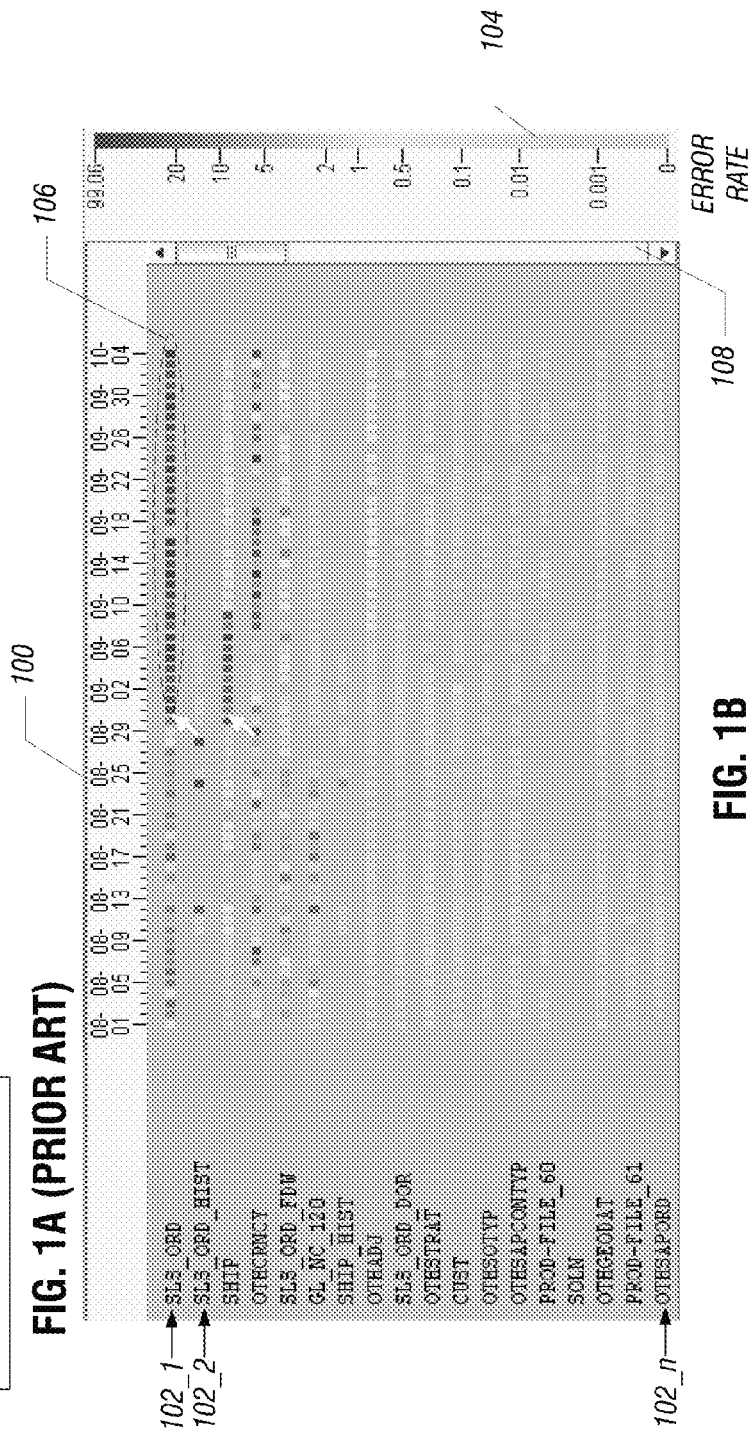
FIG. 1B illustrates the visualization of multiple time series in a color, using cell-based line charts, in accordance with an embodiment.

FIG. 1B illustrates a display region 100 for visualizing multiple time series in color, cell-based line charts. In the display region 100, multiple time series 102_1, 102_2, through 102_n are depicted in multiple corresponding cell-based line charts (also referred to as "lines") in the display region 100. The plural line charts corresponding to the plural time series 102_1, 102_2 through 102_n. The visualization using the multiple cell-based line charts presents multiple dimensions, where a first dimension includes time; a second dimension includes the categories of the multiple time series 102_1, 102_2, etc. (e.g., SLS_ORD is the name of one category, SLS_ORD_HIST is the name of another category, and so forth); a third dimension includes attribute values (which can be aggregate attribute values) represented by colors (or other visual indicators) of the cells; and a fourth dimension includes an ordering attribute to order the line charts corresponding to the different time series. Note that the four dimensions of the visualization of FIG. 1B can also be referred to as four attributes. A "display region" includes any graphical user interface (GUI) element, such as a GUI screen (e.g., a window or part of a window defined by an operating system such as WINDOWS®, UNIX, LINUX, etc.) or any other image displayable in a display device.

In the example of FIG. 1B, the cell-based lines (or line charts) 102_1 to 102_n corresponding to different time series include rows of the display region 100. In another implementation, the cell-based lines can instead be columns, in which case, the time dimension would be along the vertical direction rather than the horizontal direction of FIG. 1B. A "cell-based line" thus generally refers to a successive arrangement of cells along a particular direction in a display region.

As depicted in the example of FIG. 1B, each time series 102_i (i=1 to n) is associated with a job name (category name), where the job name refers to a particular job (the example of FIG. 1B depicts a database loading job) for which the time series data has been collected. In other examples, different time series can be provided for other categories, such as categories corresponding to different central processing units (CPUs), different servers, different software applications, different companies, different departments of an enterprise, different products, different geographic regions, and so forth. A "time series" refers to a collection or set of data values (of a given attribute) over time. In the example depicted in FIG. 1B, the data values can be expressed as daily aggregate data values (one aggregate data value per day). An aggregate data value refers to some aggregation (e.g., average, median, maximum, minimum, etc.) of data values of a particular attribute. In different implementations, the data values can be associated with different time intervals, such as seconds, minutes, weeks, months, years, and so forth.

Each cell-based line 102_i has a sequence of cells, where each cell corresponds to a different aggregate data value of the attribute represented by the time series. Note that a missing data value is represented as a gap in each line. The cells are associated with corresponding visual indicators to represent the data values of the time series. A "cell" refers to some relatively small sub-region of the display region 100. In FIG. 1B, the visual indicators include different colors for different data values. A scale 104 on the right hand side of the display screen 100 shows the spectrum of colors and corresponding data values, where green corresponds to relatively low data values, red corresponds to relatively high data values, and colors between green and red correspond to intermediate data values. In other implementations, other types of visual indicators can be used (such as different gray scale levels or different patterns).

In the illustrated example, the attribute of the time series being depicted in the display screen 100 is an error per second attribute to indicate a database loading job error rate. The database loading job error rate can refer to the error rate associated with loading database tables executed by one or more computers or CPUs. Another attribute associated with database loading that can be visualized is job duration (the time involved in performing each job). Additional attributes of the time series can also be depicted in the color, cell-based display region 100 of FIG. 1B. In fact, as discussed further below, data values for two or more attributes for each time series can be visualized in one display region. In other contexts, other types of attributes can be visualized. For example, in a sales context, example attributes include price, revenue, profit, etc.; in a network monitoring context, example attributes include utilization, loading, etc.

In the example of FIG. 1B, a portion 106 of the time series in line 102_1 indicates that there are persistent high error rates for the job name "SLS_ORD." Such persistence of high error rates is easily detectable by a user since such high error rates are represented by a stream of successive red color cells. Since each time series is represented in a separate row in the display region 100, there is no occlusion of visualizations of some time series by visualizations of other time series (as compared to occlusion that occurs in the chart of FIG. 1A).

As further depicted in FIG. 1B, a scroll bar 108 is provided to allow a user to scroll to other lines representing other times series.

According to some embodiments, the time series are ordered by some attribute, which can either be the attribute being displayed or some other attribute of the multiple time series. Ordering of the time series causes certain time series to appear near the top part of the display region so that these time series are more noticeable to the user. For example, if the time series are ordered according to an average or maximum of the error rate attribute being displayed in display region 100, then the time series with larger error rates would be presented in the top part of the display region 100 so that a user's attention would quickly focus on such time series. More generally, the lines for the corresponding time series can be ordered according to some aggregate of at least one attribute associated with the time series. Such an aggregate of the at least one attribute is referred to as an "ordering attribute." Note that the time series can also be ordered according to the categories of the respective time series.

Figure 2:
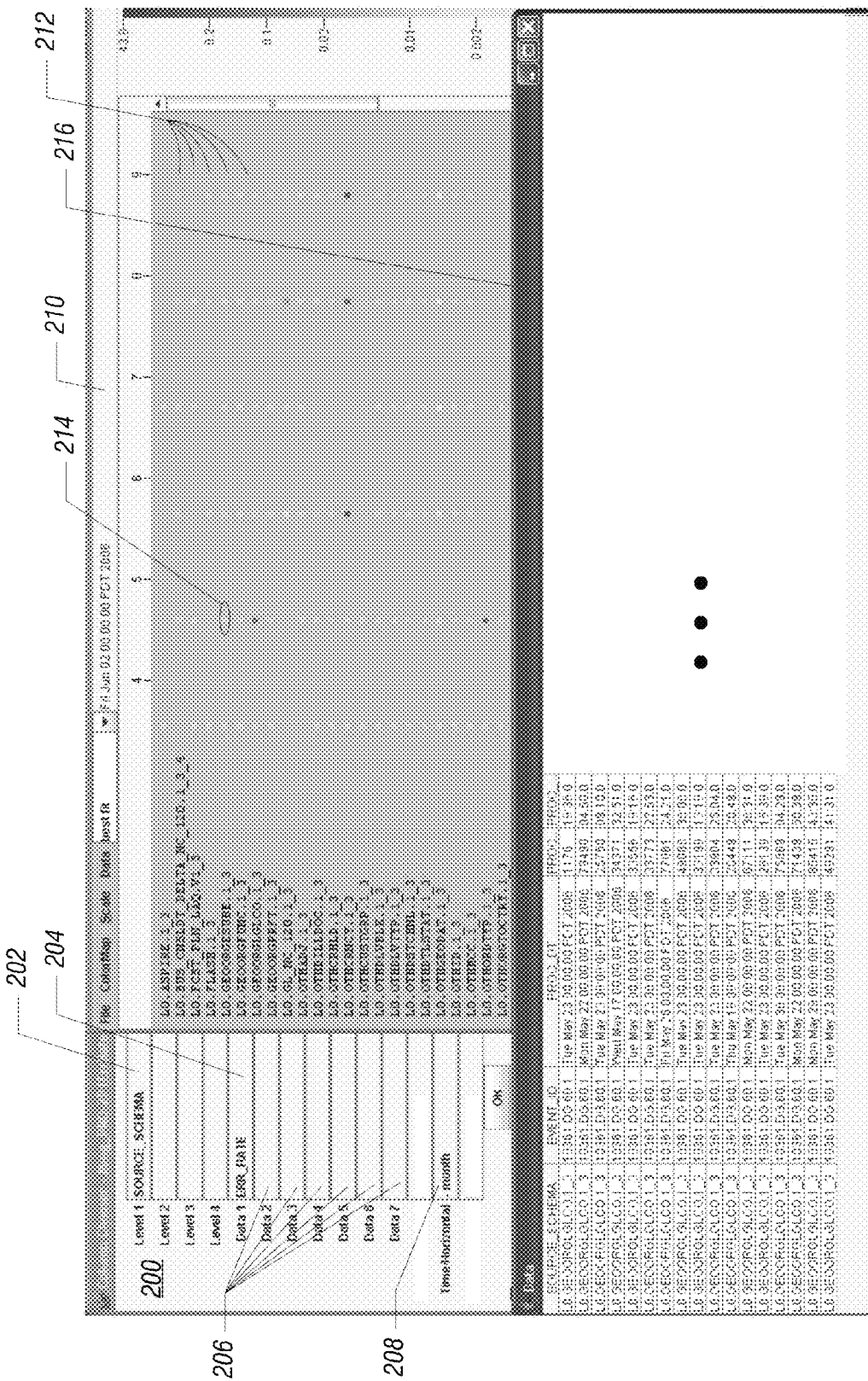

FIG. 2 shows several GUI screens containing different data associated with visualization of multiple time series. A first screen 200 ("control screen") includes input fields to allow a user to select what data to present and the manner in which the data is to be presented in color, cell-based line charts. In the example of FIG. 2, a first field 202 of the control screen 200 allows a user to select the source database, referred to as "SOURCE_SCHEMA," that contains data associated with the time series. Another field 204 allows a user to input the attribute of the time series to be visualized in the color, cell-based line charts. In the example of FIG. 2, the attribute to be visualized is the error rate ("ERR_RATE"). Other fields 206 in the screen 200 allow a user to enter additional attributes to be visualized in the color, cell-based line charts. Thus, in the example of FIG. 2, up to seven attributes can be visualized for each time series in each color, cell-based line chart. In other implementations, additional data fields can be provided to allow a user to enter additional attributes.

Another data field 208 in the control screen 200 is a time/horizontal data field to allow a user to specify the time interval in each row of the color, cell-based line charts. In the example of FIG. 2, the time interval specified in the field 208 is a month interval, where each cell in a row represents a corresponding month. Note that aggregation of data values for the attribute specified in the attribute field 204 can be performed to properly visualize the data value for the time interval specified in field 208. For example, if data values of a particular attribute are collected on a daily basis, but a user specifies monthly intervals for visualizing the multiple time series, then the daily data values of the attribute are aggregated (e.g., summed) to produce the data value for each month. In other words, data values of an attribute collected at a finer time interval are aggregated to produce data values at a coarser time interval. Other example aggregates of data values include average, maximum, minimum, median, and so forth.

In FIG. 2, a second screen 210 ("visualization screen") depicts the color, cell-based line charts for visualizing multiple time series. As illustrated in FIG. 2, each time series is depicted in a corresponding row 212 (a line chart), where each of the cells of a row 212 represents the data value (possibly aggregated) of the selected attribute for a particular month interval.

Another feature provided by some embodiments of the invention is the ability to drill down to obtain further details regarding any of the particular cells that are presented in the line charts. For example, a user can click on cell 214 to obtain details regarding the cell 214, where cell 214 is in a row associated with a time series corresponding to a job having job name "LO.GEOORGESUBE.1_3." Clicking the cell 214 causes a third screen 216 ("detail screen") to be presented, where the detail screen 216 depicts a table that has multiple rows and columns. The data contained in the table of the detail screen 216 is extracted from the source database specified in field 202 of the control screen 200 to allow a user to analyze details associated with a particular cell of the line charts.

Figure 3:
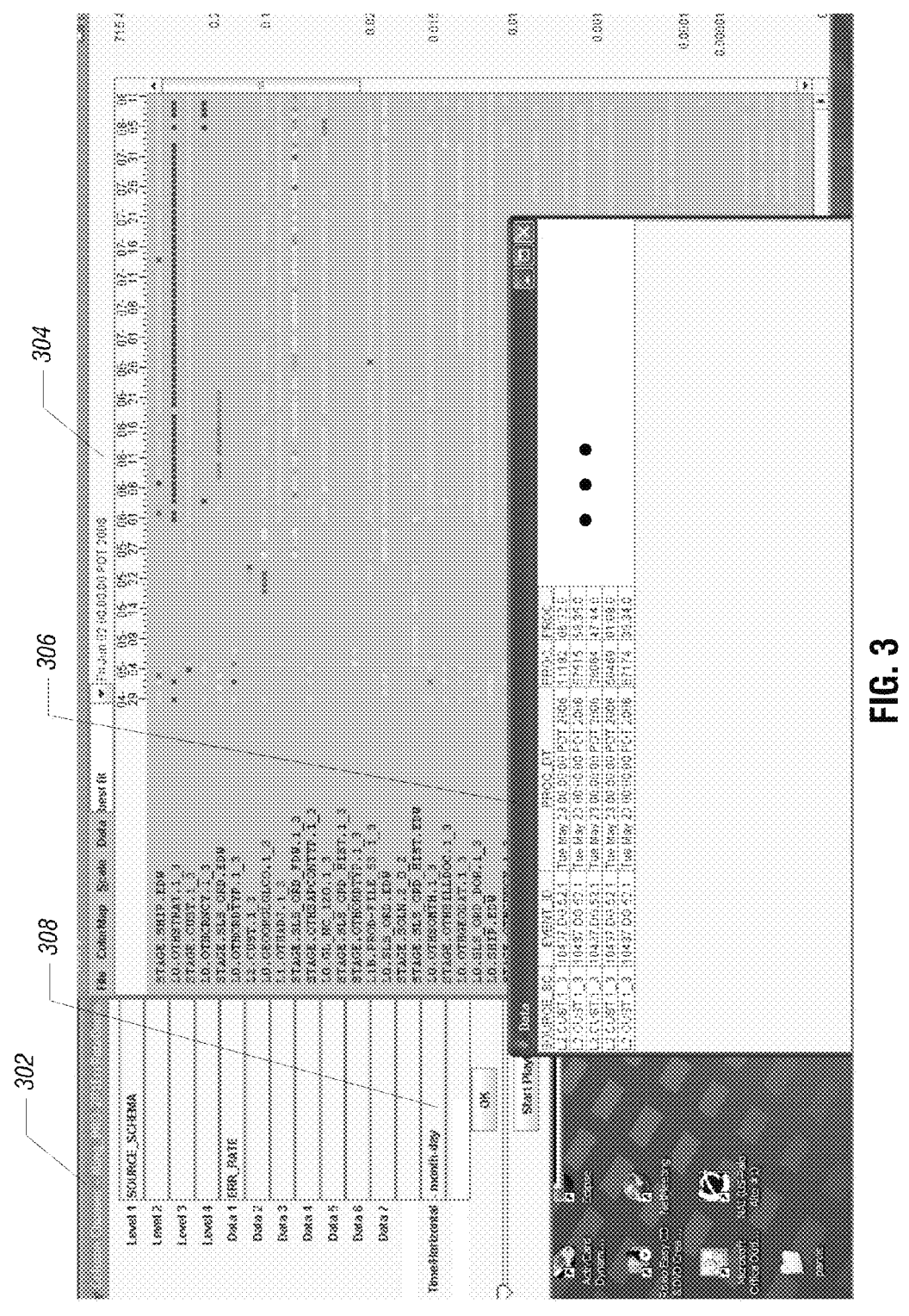

FIG. 3 shows another set of screens 302 (control screen), 304 (visualization screen), and 306 (detail screen), where the user has specified a different time interval, in this case, a daily time interval as indicated in field 308 of the control screen 302. As seen in the visualization screen 304, each cell of a particular row corresponding to a respective time series contains a data value for a particular day. Selection of one of the cells in a line chart causes the detail screen 306 to be presented.

Figure 4:
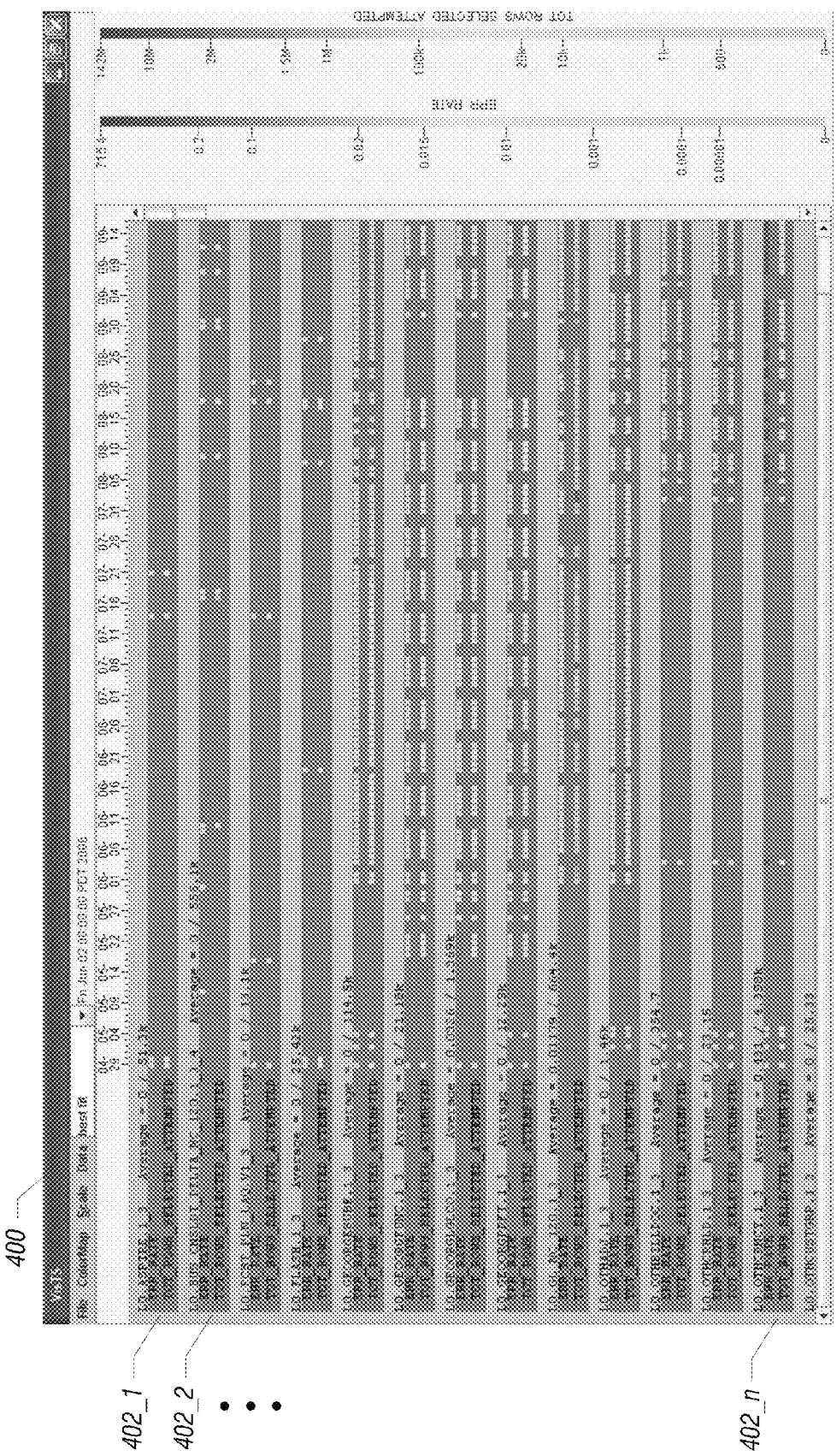
FIG. 4 illustrates the visualization of more than one attribute for multiple time series in the color, cell-based line charts, according to an embodiment.

FIG. 4 shows another example visualization screen 400 that includes a color, cell-based line chart visualization of multiple time series, where multiple attributes have been selected for visualization. In the example visualization screen 400 of FIG. 4, multiple rows 402_1, 402_2 through 402_n are depicted, where each of the rows correspond to a different one of the multiple time series visualized in the visualization screen 400. Each row 402_i (i=1 to n) contains two sub-rows (or sub-lines); where each sub-row depicts data values associated with a different attribute. Thus, for example, in row 402_1, a first sub-row contains cells corresponding to data values of attribute "ERR_RATE," while a second sub-row contains cells representing data values of another attribute "TOT_ROWS_SELECTED_ATTEMPTED." In the implementation of FIG. 4, each of the line charts that are included in the visualization screen 400 includes two sub-rows for visualizing different attributes. Additional attributes can be selected by a user in a control screen for presenting in additional sub-rows of the same visualization screen, if desired.

Figure 5:
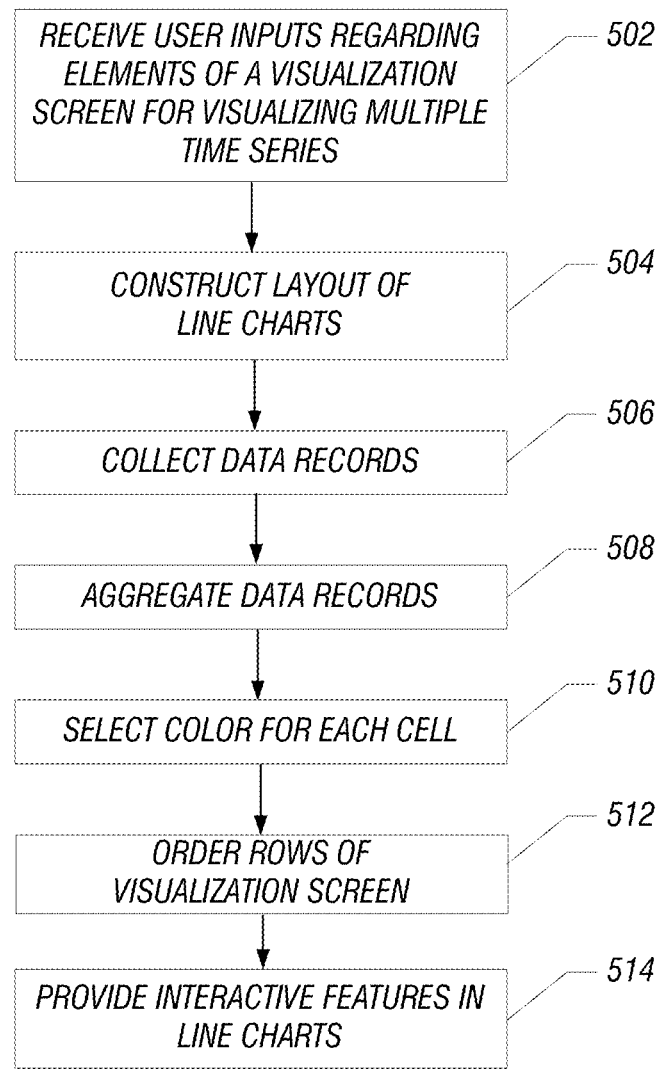
FIG. 5 is a flow diagram of a process of visualizing multiple time series performed by software according to some embodiments.

FIG. 5 illustrates a process performed according to an embodiment for visualizing multiple time series. The process of FIG. 5 can be performed by software executable in a computer, according to some implementations. Initially, user inputs are received (at 502) regarding elements of a visualization screen for visualizing multiple time series. The received user input can specify the time interval (day, hour, quarter hour, minutes, etc.) for the columns of the visualization screen. Another user input includes the attribute (or multiple attributes) to visualize. A further user input is the data category (e.g., job name) for presenting in corresponding rows. Each data category corresponds to the respective time series of data values. Instead of job name, other categories include country name, product name, and so forth.

The user inputs can be selected in a control screen such as those depicted in FIGS. 2 and 3. Alternatively, pull-down menus can be presented in the GUI to allow for selection of user inputs.

Based on the user inputs, the layout of the color, cell-based line charts is constructed (at 504). In one implementation, the columns of the visualization screen correspond to time intervals, while the rows correspond to different categories (different time series). If a data value for any given time interval is missing, then that would be represented as a gap in the corresponding row. Note that instead of presenting time in columns and different categories in rows, the opposite can be performed, where time is presented in rows while different categories are presented in different columns of the visualization screen.

In some embodiments, the visualization screen is represented as a fixed-position array $(X_n, Y_m)$, where n is the number of rows (for corresponding categories) and m is the number of columns (for corresponding time intervals). The array $(X_n, Y_m)$ thus has the following general form:

T1, T2, . . . , $T_m$ (time intervals)
D1, D2, . . . , $D_m$ (data values of attribute for category or time series D).
E1, E2, . . . , $E_m$ (data values of attribute for category or time series E).

D1, D2, D, . . . , $D_m$ represent data values in a first sub-row, and E1, E2, . . . , $E_m$ represent data values in a second sub-row. If only one attribute is selected for display, then E1, E2, . . . , $E_m$ would be omitted. Additional rows for additional time series of other categories are also part of the array.

The term "fixed-position array" refers to the fact that the cells of the array for different time series line up in both the row and column dimensions. Thus, between any two rows, the cells for the same time interval would appear in the same column. Any missing data is simply left as a blank spot (gap). The alignment of cells for the same time interval in the column allows a user to easily compare different time series.

Next, the software collects (at 506) data records from a selected database for each position of the fixed-position array. If aggregation is appropriate, then an aggregation is performed (at 508) by the software to aggregate the collected data records to form data values for presenting in corresponding cells of the visualization screen.

Next, based on the data values obtained according to 506 and 508, a color (or other visual indicator) is selected (510) for each of the cells. Next, the different rows corresponding to different time series of the visualization screen are ordered (at 512) according to at least one attribute of the time series. For example, the ordering of the time series in the visualization screen can be performed according to some aggregatation of the attribute that is being visualized. In one example discussed above, the attributes being visualized in the visualization screen is the error rate. Ordering time series based on an aggregation of this attribute would order time series according to some aggregate of the error rate, such as maximum, minimum, average, and so forth. Thus, in one example, time series containing higher maximum data values for the error rate attribute will be ordered to be one of the first few rows of the visualization screen to allow a user to more quickly see time series that are associated with high maximum error rates (which presumably are the time series of higher concern).

The software also provides (at 514) built-in interactive features in the color, cell-based line charts such that a user can perform exploration activities of the data presented in the line charts. For example, the user can select cells to drill down into the details of any particular cell.

By using the cell-based time series line charts described above, a user can visually compare many time series associated with different categories to detect data changes, patterns, and trends over time. The comparison of different time series can be performed at a glance, since occlusion between different time series does not occur in the line chart format. The line chart format allows for a high-level interactive dashboard view. It also allows for detailed data exploration by drilling down into regions of the line charts that appear to contain anomalies or that may indicate problems.

Figure 6:
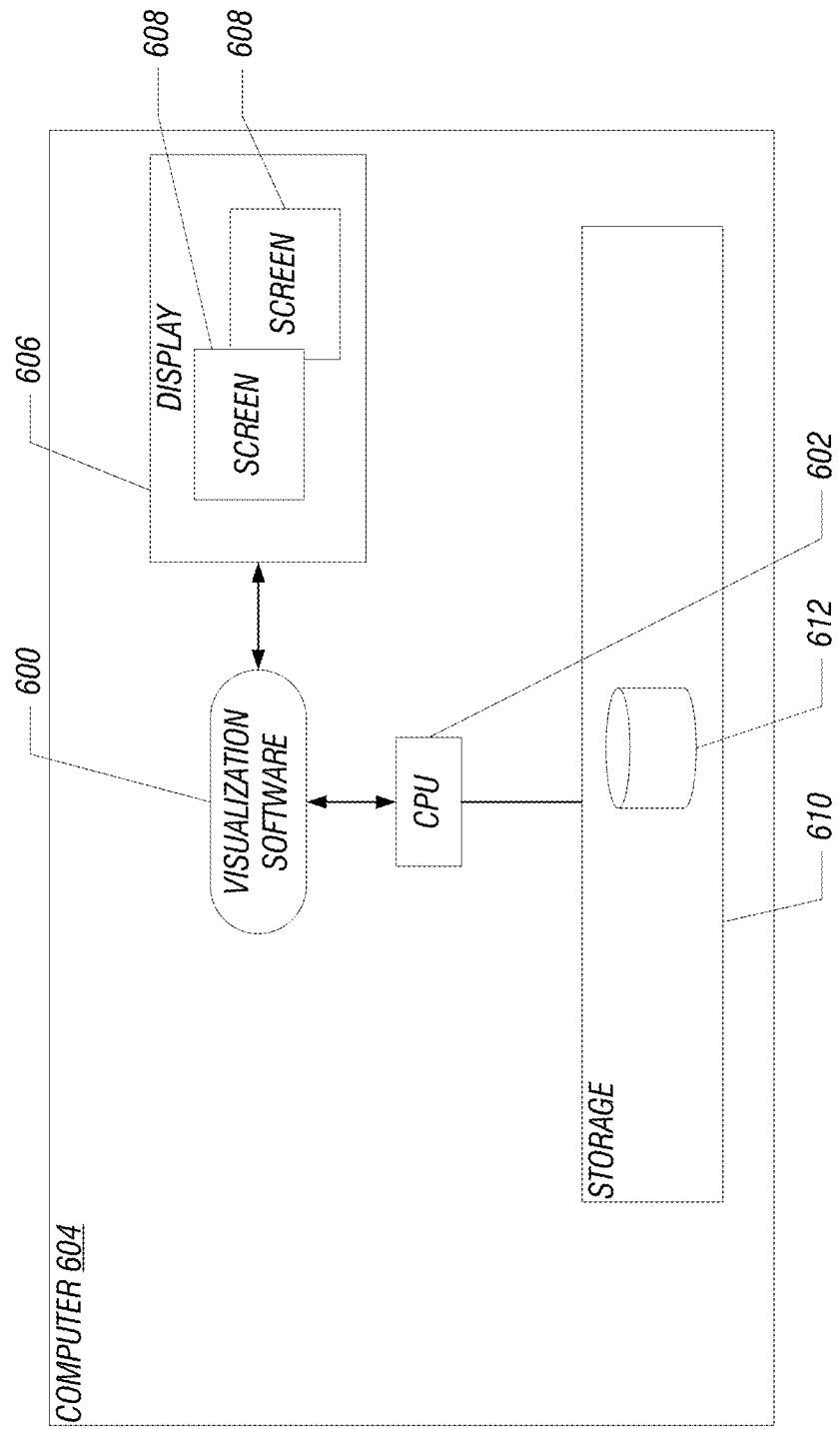
FIG. 6 is a block diagram of a computer in which the software according to some embodiments of FIG. 5 is executable.

FIG. 6 depicts a computer 604 having visualization software 600 that can be used to perform various tasks discussed above. The visualization software 600 is executable on one or more central processing units (CPUs) 602 of the computer 604.

The computer 604 further includes a display device 606 that can display one or more GUI screens associated with the visualization software 600. For example, one screen 608 can be used for displaying the color, cell-based line charts of multiple time series. Another screen 608 can be used to present control fields, while yet another screen can be used for displaying detail data. The computer 604 further includes a storage 610 for storing a database 612, where the database can contain the data associated with various time series for visualization in the display device 606.

Note that although the display device 606 and database 612 are depicted as being part of the computer 604, the display device 606 and the database 612 can actually be remotely located from the computer 604 in other implementations. For example, the visualization software 600 can be executable on a server computer, whereas the actual visualization can be performed at a remote client computer. Also, the database 612 can be stored in yet another database server that is located somewhere in a network.

Thus, visual indicators set by the visualization software 600 for respective data values to be displayed in corresponding cells of a line chart can be presented for display at the local display device 606 or at a remote display device, which can be located in another computer connected over a network.

Instructions of software described above (including visualization software 600 of FIG. 6) are loaded for execution on a processor (such as one or more CPUs 602 in FIG. 6). The processor includes microprocessors, microcontrollers, processor modules or subsystems (including one or more microprocessors or microcontrollers), or other control or computing devices. A "processor" can refer to a single component or to multiple components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of visualizing time series data, comprising:
   receiving a plurality of time series having corresponding sets of data over time;
   presenting, for display in a display region, visual indicators for values of at least a first attribute of the plurality of time series in corresponding cell-based lines, wherein the cell-based lines have cells to display the corresponding visual indicators for the values of the at least first attribute over time;
   computing, by a system having a processor, a corresponding aggregate value of the values of at least the first attribute for each of the plurality of time series; and
   ordering, by the system, the cell-based lines corresponding to the respective plurality of time series in the display region according to the aggregate values of corresponding ones of the plurality of time series, wherein the ordering includes placing a first of the cell-based lines associated with a larger aggregate value closer to a first part of the display region, and placing a second of the cell-based lines associated with a smaller aggregate value farther away from the first part of the display region.

2. The method of claim 1, wherein computing the corresponding aggregate values comprises computing one of maximum values, minimum values, average values, and median values.

3. The method of claim 1, wherein the values of the at least first attribute are for first time intervals, the method further comprising:
   producing the values of the at least first attribute by aggregating values for time intervals finer than the first time intervals.

4. The method of claim 1, further comprising ordering the time series according to categories of the time series.

5. The method of claim 1, wherein presenting the visual indicators for display comprises presenting different colors for different values.

6. The method of claim 5, further comprising displaying a color scale to map values of the first attribute to corresponding colors.

7. The method of claim 1, further comprising displaying, in a display device, the visual indicators for values of the at least first attribute in the corresponding cell-based lines.

8. The method of claim 1, wherein presenting the visual indicators for display in corresponding cell-based lines comprises presenting the visual indicators for display in corresponding rows, wherein ordering the cell-based lines comprises ordering the rows according to the aggregate values of corresponding ones of the plurality of time series, wherein each of the rows represents a corresponding one of the plurality of time series.

9. The method of claim 1, wherein presenting the visual indicators for values of at least the first attribute comprises presenting the visual indicators for values of plural attributes of the plurality of time series,
   wherein each cell-based line has cell-based sub-lines corresponding to the plural attributes.

10. The method of claim 1, further comprising:
    displaying the display region containing the visual indicators in a first graphical user interface (GUI) screen; and
    displaying a control GUI screen providing fields to accept user inputs.

11. A method of visualizing time series data, comprising:
    receiving inputs regarding content and layout of cell-based line charts for representing plural corresponding time series;
    receiving data values of a particular attribute of the plural time series to be presented by the cell-based line charts; and
    assigning visual indicators to the received data values for display in corresponding cells of the cell-based line charts;
    computing, by a system having a processor, a corresponding aggregate value of the data values of the particular attribute for each of the plural time series; and
    ordering, by the system, the line charts according to the aggregate values of the particular attribute of corresponding ones of the plural time series, wherein the ordering includes placing a first of the line charts associated with a larger aggregate value closer to a first part of a display region, and placing a second of the line charts associated with a smaller aggregate value farther away from the first part of the display region.

12. The method of claim 11, wherein receiving the inputs comprises receiving user inputs in a first graphical user interface (GUI) screen, the method further comprising displaying the cell-based line charts in a second GUI screen that contains the display region.

13. The method of claim 12, further comprising:
    receiving selection of at least one cell in one of the cell-based line charts; and
    presenting a detail screen containing detail of data associated with the at least one cell.

14. The method of claim 11, wherein assigning the visual indicators comprises assigning different colors to different data values.

15. The method of claim 11, wherein the first part of the display region is a top part of the display region, wherein the first line chart closer to the top part of the display region is more noticeable to a user.

16. A non-transitory computer-readable storage medium storing instructions that when executed cause a computer to:
    receive a plurality of time series having corresponding sets of data over time;
    present, for display in a display region, visual indicators for values of at least a first attribute of the plurality of time series in corresponding cell-based lines, wherein the cell-based lines have cells to display the corresponding visual indicators for the values of the at least first attribute over time;
    compute a corresponding aggregate value of the vales of at least the first attribute for each of the plurality of time series; and
    order the cell-based lines corresponding to the respective plurality of time series in the display region according to the aggregate values of the at least the first attribute of the plurality of time series, wherein the ordering includes placing a first of the cell-based lines associated with a larger aggregate value closer to a first part of the display region, and placing a second of the cell-based lines associated with the smaller aggregate value farther away from the first part of the display region.

17. The non-transitory computer-readable storage medium of claim 16, wherein presenting the visual indicators for display comprises presenting different colors for different values.

18. The method of claim 1, wherein the first part of the display region is a top part of the display region.

19. The non-transitory computer-readable storage medium of claim 16, wherein the first part of the display region is a top part of the display region.

20. The non-transitory computer-readable storage medium of claim 16, wherein the cell-based lines are rows in the display region, and wherein ordering the cell-based lines comprises ordering the rows according to the aggregate values of corresponding ones of the plurality of time series, wherein each of the rows represents a corresponding one of the plurality of time series.

* * * * *

UNITED STATES PATENT AND TRADEMARK OFFICE
CERTIFICATE OF CORRECTION

| | |
|---|---|
| PATENT NO. | : 8,924,843 B1 |
| APPLICATION NO. | : 11/796809 |
| DATED | : December 30, 2014 |
| INVENTOR(S) | : Ming C. Hao et al. |

It is certified that error appears in the above-identified patent and that said Letters Patent is hereby corrected as shown below:

In the Claims

In column 8, line 56, in Claim 16, delete "vales" and insert -- values --, therefor.

Signed and Sealed this
Twenty-eighth Day of April, 2015

Michelle K. Lee
*Director of the United States Patent and Trademark Office*